United States Patent
Andersson et al.

(10) Patent No.: US 6,634,568 B1
(45) Date of Patent: Oct. 21, 2003

(54) METHOD AND MEANS FOR DRYING CEMENTED CARBIDE AND SIMILAR

(75) Inventors: Alf Andersson, Ödåkra (SE); Bo Nelander, Älvsjö (SE); Ulf Jutterström, Stockholm (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 09/787,718

(22) PCT Filed: Sep. 24, 1999

(86) PCT No.: PCT/SE99/01698
§ 371 (c)(1),
(2), (4) Date: May 31, 2001

(87) PCT Pub. No.: WO00/18529
PCT Pub. Date: Apr. 6, 2000

(30) Foreign Application Priority Data

Sep. 25, 1998 (SE) .............................................. 9803289

(51) Int. Cl.⁷ .............................................. B05B 17/04
(52) U.S. Cl. ........................... 239/7; 239/224; 239/500; 239/555
(58) Field of Search ........................... 239/7, 214, 222, 239/222.11, 223, 224, 500, 554, 555, 700, 702; 264/5, 8; 425/6, 8; 75/330, 333, 334

(56) References Cited

U.S. PATENT DOCUMENTS

| | | | | |
|---|---|---|---|---|
| 1,266,501 A | * | 5/1918 | Leitch | 239/555 |
| 1,506,226 A | * | 8/1924 | Dick | 239/224 |
| 3,017,116 A | * | 1/1962 | Norris | 239/702 |
| 3,556,400 A | * | 1/1971 | Gebhardt et al. | 239/224 |
| 4,221,332 A | * | 9/1980 | Bals | 239/223 |
| 4,290,993 A | * | 9/1981 | Maringer | 264/8 |
| 4,776,520 A | * | 10/1988 | Merritt | 239/223 |
| 4,978,069 A | | 12/1990 | Andersson et al. | |
| 5,259,861 A | * | 11/1993 | Yeh et al. | 75/334 |
| 6,098,895 A | | 8/2000 | Walzel et al. | |

FOREIGN PATENT DOCUMENTS

DE  4308842  9/1994

* cited by examiner

Primary Examiner—Steven J. Ganey
(74) Attorney, Agent, or Firm—Burns, Doane, Swecker & Mathis, L.L.P.

(57) ABSTRACT

A new method and apparatus for manufacturing powders of cemented carbide, cermets, ceramics and similar materials with good abrasive wear resistance starting from a slurry, wherein the slurry is introduced into a drop forming device including at least one essentially horizontal oriented rotating drop forming disk (12), from which the drops are slung out to solidify by centrifugal force. According to the invention the slurry is ejected from a discharge opening (21) on the drop former in the form of a jet such that it hits a first obliquely downward and inwardly directed surface (22) whereby the speed of rotation of the disk is chosen such that the jet of liquid is forced upwards over the first surface as well as over to another connected horizontal surface (23) and thereafter is ejected as a split jet against a second obliquely downwards-outwards directed surface (25) such that the slurry is accelerated to the speed of the drop forming disk (12) and then is led over a third surface (26) obliquely directed outwards, from where the drops are then caused to detach themselves and fall down, thus forming a powder.

7 Claims, 4 Drawing Sheets

METHOD AND MEANS FOR DRYING CEMENTED CARBIDE AND SIMILAR

FIELD OF THE INVENTION

The present invention relates to cemented carbides and a method and device for drying powder mixtures of cemented carbide and the like.

BACKGROUND OF THE INVENTION

In the discussion of the state of the art that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Cemented carbide is made by powder metallurgical methods consisting of the wet milling in an alcohol-water-solution of a powder mixture containing powder forming the hard constituents and a binder phase, drying of the milled mixture to a powder with good flow properties by spray drying, pressing of the dried powder to bodies of desired shape and finally sintering.

The intensive milling operation is performed in mills of different sizes using cemented carbide milling bodies. Milling is considered necessary to obtain a uniform distribution of the binder phase in the milled mixture. The milling time can vary from several hours up to days. The milling operation produces a slurry suitable for spray drying. Successful spray drying depends strongly on the properties of the slurry. The present technology with intensive milling under long periods of time usually gives a very fine-grained powder whose sedimentation rate is sufficiently slow. As result of the spray drying a ready-to-press powder is obtained consisting essentially of spherical agglomerates of about 0.1 mm mean size.

It is desirable that the spray-dried powder shall be in the form of spherical well-defined agglomerates with a limited variation of the sizes of the agglomerates. Thus, a more even powder density is obtained, giving improved flow properties as well as a reduction of filling variations in the subsequent pressing operation. The distribution or size variations can be influenced by optimising the alcohol to water ratio and liquid to powder ratio in the slurry, the amount of pressing agent etc. Another way is to modify the nozzles in the spray drier. A variant of such a nozzle is described in U.S. Pat. No. 4,978,069. This patent relates to the generation of even drops from a melt, but it can also be applied to drying of cemented carbide powder. However, it has been found that this does not give the desired limited variation of the sizes of the agglomerates. It has been found better to use a simpler nozzle instead, and expose the powder to a fractioned sieving after the drying process to eliminate the relatively coarse and fine part of the agglomerates to obtain the desired narrow distribution of sizes. The distribution after the sieving must be controlled since there is a risk of clogging of the net of the sieve, which may influence the results. The sieving also adversely affects the properties of the powder. However, the distribution of sizes of the agglomerates is normally so broad that the final distribution cannot be made as narrow as desirable for economical reasons. A way to describe distribution of the sizes of the agglomerates is through the expression $d97/d03$ where $d97$=the grain size below which 97% of the agglomerates are found and $d03$=the grain size below which 3% of the agglomerates are found. A $d97/d03$ value=4 has been found to be acceptable. However, it is desirable to obtain an even lower value, preferably without a subsequent sieving operation.

SUMMARY OF THE INVENTION

It is an object of the invention to overcome the disadvantages of the prior art.

It is an object of the present invention to provide a method for the production of cemented carbide powder with a limited distribution of grain sizes $d97/d03<4$, without subsequent sieving.

Surprisingly it has now been found that if the apparatus, according to U.S. Pat. No. 4,978,069 is modified in the way more closely described below a cemented carbide powder is obtained with the desired limited distribution of grain sizes.

In an apparatus for drop forming by disks, according to the present invention, jets of the liquid are ejected towards a first funnel-shaped part where the liquid is accelerated in a first step after which the jets are permitted to spread somewhat, they are then ejected over to a second funnel-shaped part where the liquid is accelerated in a second step to the speed of the drop forming disk. The acceleration of the liquid is thus divided into two steps. During the second acceleration step the acceleration is increased because the spreading of the jet results in increased surface contact.

At the periphery of the drop forming disk the risk that contact between the surface of the disk and the liquid be broken is minimized thanks to the fact that the outermost part of the disk is angled relative to the plane of rotation in such a way that the centrifugal force acting on the liquid is split into one component directed along the surface of the disk and one directed against the surface of the disk. In this way the contact between the surface of the disk and the layer of liquid right up to the means of drop forming is ensured.

According to one aspect, the present invention provides a method of making powders from a slurry, the method comprising the steps of: (i) introducing the slurry into a drop forming apparatus; (ii) ejecting the slurry from a discharge opening to form a jet such that the jet hits an inwardly and downwardly oriented first oblique rotating surface; (iii) rotating the first surface at a speed such that the jet is forced upwards over the first surface and over another connected horizontal surface by centrifugal forces; (iv) dividing and directing the jet towards an outwardly and downwardly oriented second oblique rotating surface; (v) rotating the second surface such that the slurry in the jet is accelerated to the speed of rotation of the second surface; (vi) directing the jet onto an outwardly oriented third oblique rotating surface, from which drops of the slurry detach themselves when centrifugal forces on the third surface exceeds adhesive forces between the drops and the third surface.

According to another aspect, the present invention provides an apparatus for forming drops from a slurry, the apparatus comprising: a plurality of rotatable disk units, the disk units comprising a number of disks arranged axially on top on each other, the disks have a cross-section comprising a radially inner section with a substantially U-shaped recess constructed to receive a raised L-shaped section of an adjacent disk with sufficient play therebetween to allow radial ejection of a jet of the slurry; and a distributor for uniformly distributing the slurry onto the plurality of disk units.

According to yet another aspect, the present invention provides powdered agglomerates of cemented carbide, cermets, ceramics or similar materials with abrasive wear resistance wherein the agglomerates have a distribution of size, prior to sieving, such that a ratio of $d97/d03<4$ wherein d97=the grain size below which 97% of the agglomerates is found and d03=the grain size below which 3% of the agglomerates is found.

DETAILED DESCRIPTION OF THE INVENTION

Figure 1:
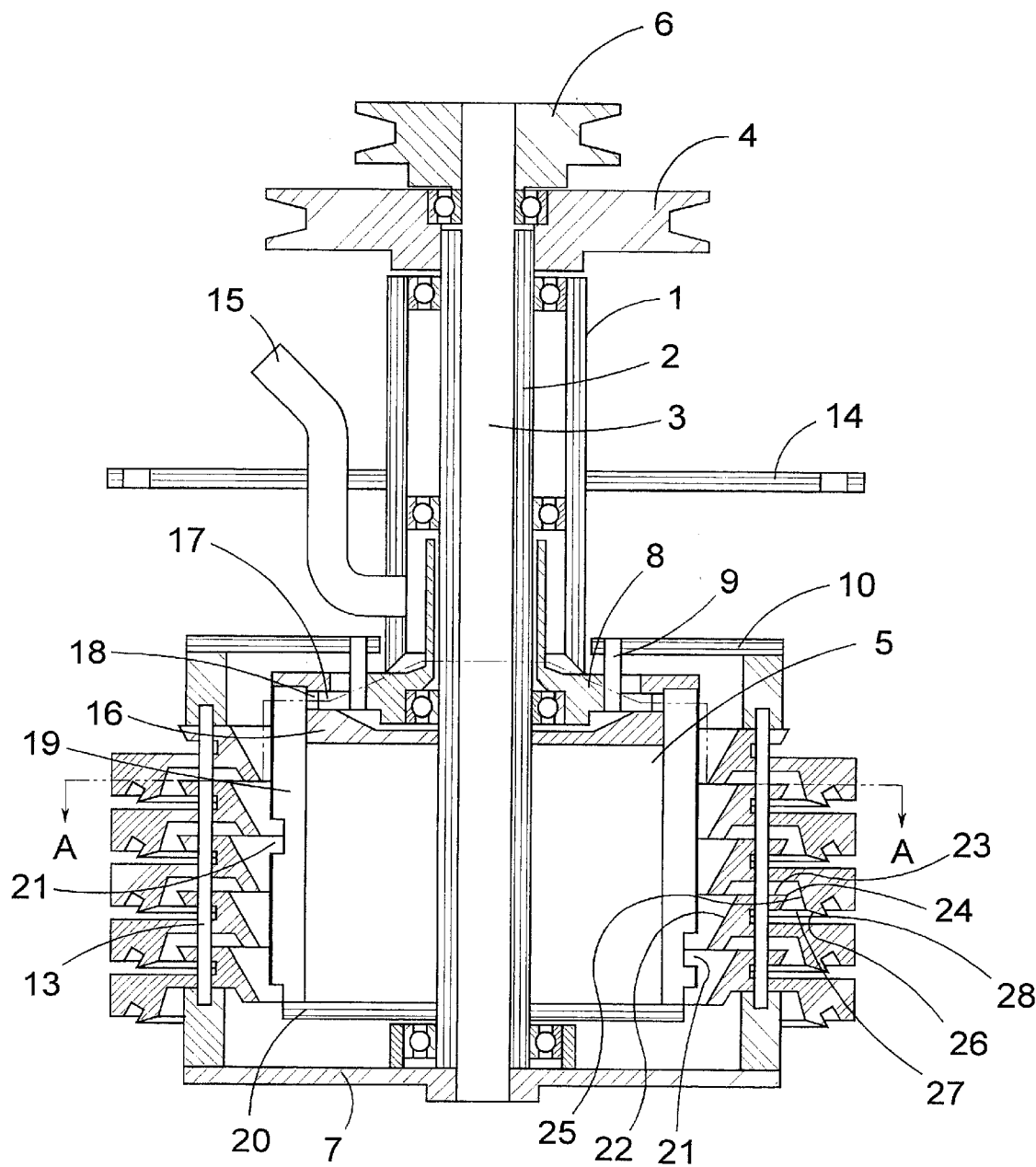
FIG. 1 shows the drop forming means in a longitudinal section view.
Figure 2:
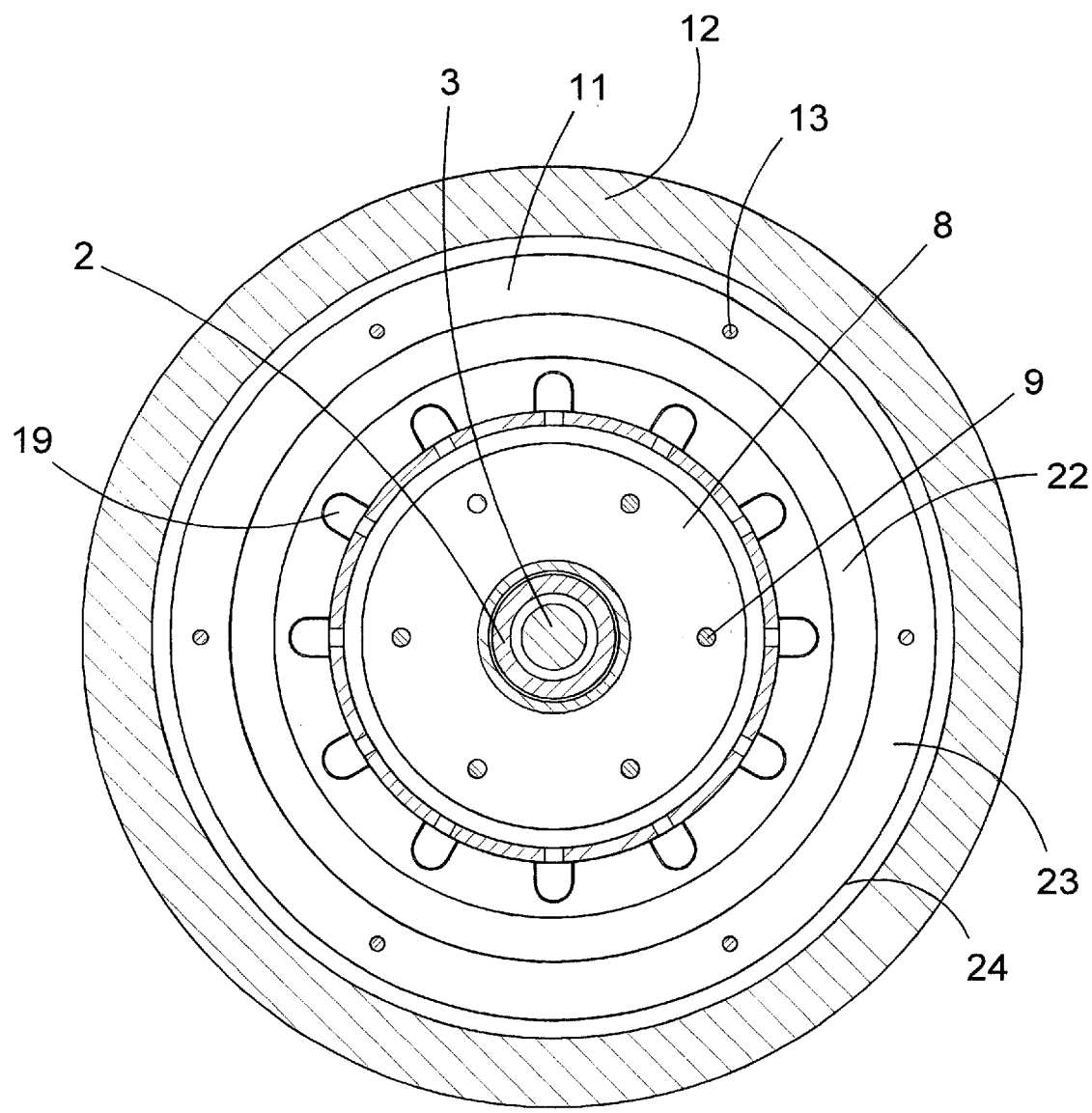
FIG. 2 shows a section along the line A—A in FIG. 1.
Figure 3:
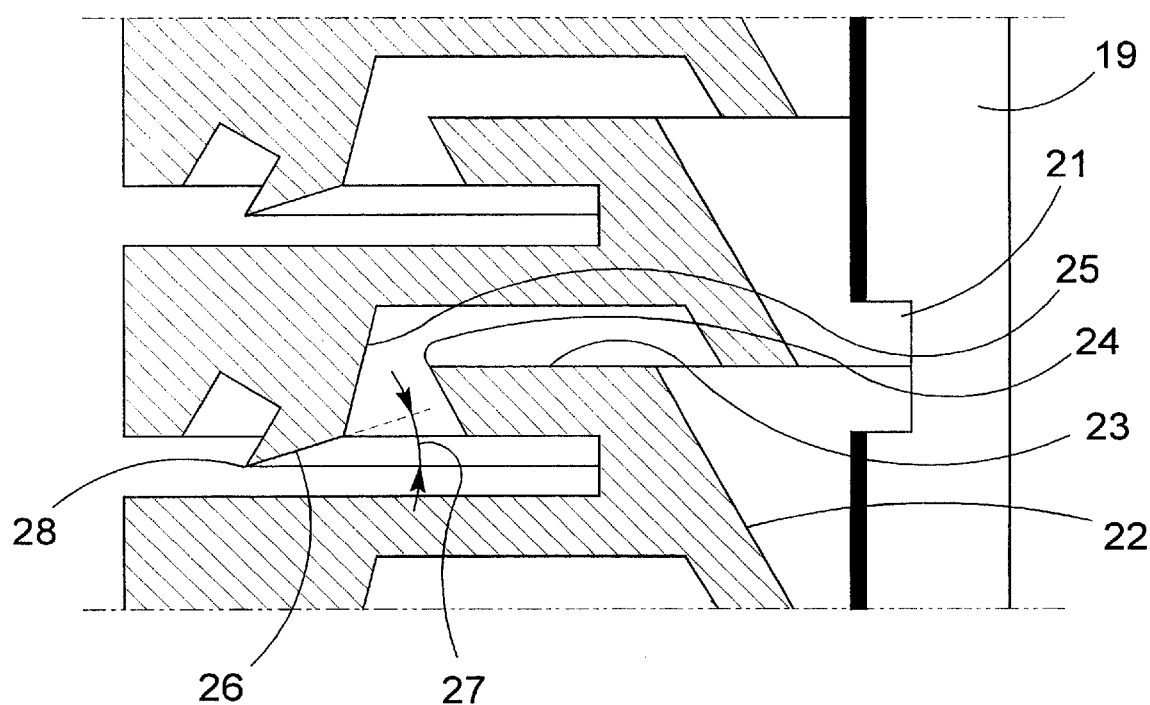
FIG. 3 shows part of a drop-forming disk in greater detail.

More particularly the means of drop forming according to the invention consists of a bearing housing 1 in which a tube shaped shaft 2 is mounted, in which a shaft 3 is mounted. A belt pulley 4 and a slinger rotor 5 are mounted on the shaft 2, and a belt pulley and a lower disk 7 are mounted on the shaft 3. A distributor disk 8, to which is connected an upper disk by means of rods 13 is mounted on the shaft 2. The bearing housing 1 has a flange 14 for the mounting of the drop forming apparatus in, e.g.—a drying chamber, and an in-feed tube 15 for the liquid. The belt pulley 6, the shaft 3, lower disk 7, the slinger rotor 5, the upper disk 10 and the distributor disk 8 constitute a rigidly inter-connected rotatable unit. The slinger rotor 5 has a receiving disk 16 with a groove 17 in the bottom of which are formed uniformly distributed, even sized holes 18, to which are arranged axially proceeding channels 19, which are connected at their lower ends to a disk 20. The channels 19 have discharge openings 21 arranged at the funnel-shaped part 22 of the drop forming disks. This part transforms into an essentially plane part 23 with a sharp edge 24, directed towards a second funnel-shaped part 25, which in its lower part transforms to a surface 26, which is directed at an angle 27 towards the plane of rotation of the drop forming disk. The surface 26 extends radially to a sharp edge 28, on which (not shown) are arranged means of drop forming in the shape of uniformly distributed, uniform, protruding bumps.

An arrangement according to one embodiment of the invention has suitably the following dimensions:

Radius of the distributor disk 8: 12.5–20 cm.

Radius of the lower disk 7: 10–15 cm.

Number of drop forming disks 5: 10–25.

Angle of the funnel-shaped part 22: 45–55°, preferably about 50° to the horizontal plane.

Angle of the funnel-shaped part 25: 65–75°, preferably about 70° to the horizontal plane.

Angle of the funnel-shaped part 26: <10°, preferably about 5° to the horizontal plane.

With these dimensions a drying capacity of 100–500 kg cemented carbide powder/hour is obtained.

When in use, the two belt pulleys 4, 6 and thereby also the shafts 2, 3 and the means connected thereto are rotated. Liquid is supplied through the supply tube 15 and flows down onto the distributing disk 8, from which it is ejected against the groove 17. The shaft 3 is generally rotated with considerably higher speed than the shaft 2 which results in the liquid being ejected from the distributor disk 8 into the groove 17 and it is then brought to flow into the groove 17 in the direction of rotation of the distributor disk. The liquid which hits the groove 17 in a part which is limited by the farther edge of a hole 18 and that of the next hole 18 seen in the direction of the flow of the liquid and it flows out via the farther hole 18 and is led further away via the channel 19. The accuracy of the distribution is further improved in that each and every one of the holes 18 continuously occupies all the positions on the circumference. The liquid is ejected from the discharge opening 21 in the form of a jet towards the funnel-shaped part 22 of the drop-forming disk 12. The liquid is accelerated in the direction of the drop forming disk and moves in connection herewith outwards/upwards over the funnel-shaped part 22 and the plane part 23 and is ejected as a divided jet towards the other funnel shaped part 25, where the liquid is accelerated to the speed of the drop forming disk 12 and led out over the surface 26 to the means of drop forming from which the drops are released.

EXAMPLE 1

A cemented carbide slurry with the composition 6% Co and the balance substantially comprised of WC was dried using a drop generator according to the invention and was compared to material with corresponding composition which had been spray dried with a pressure nozzle and subsequently sieved according to the known technique previously discussed. The generator according to the invention consisted of twelve disks and it had a diameter of 330 mm. The drying capacity was 450 kg/h.

After drying distribution of sizes in the agglomerate was determined by sieve analysis as well as laser diffraction analysis. It was found, surprisingly, that a generator according to the invention gave such a narrow distribution of sizes that a distribution factor of d97/d03=3.6 could be obtained essentially without sieving.

By contrast, powder dried with a nozzle by conventional techniques required elimination by sieving of 15 weight-% of the powder to achieve a distribution factor of d97/d03=4, and in order to achieve a distribution factor of d97/d03=3 elimination of more than 20 weight-% of the powder by sieving is necessary.

Figure 4:
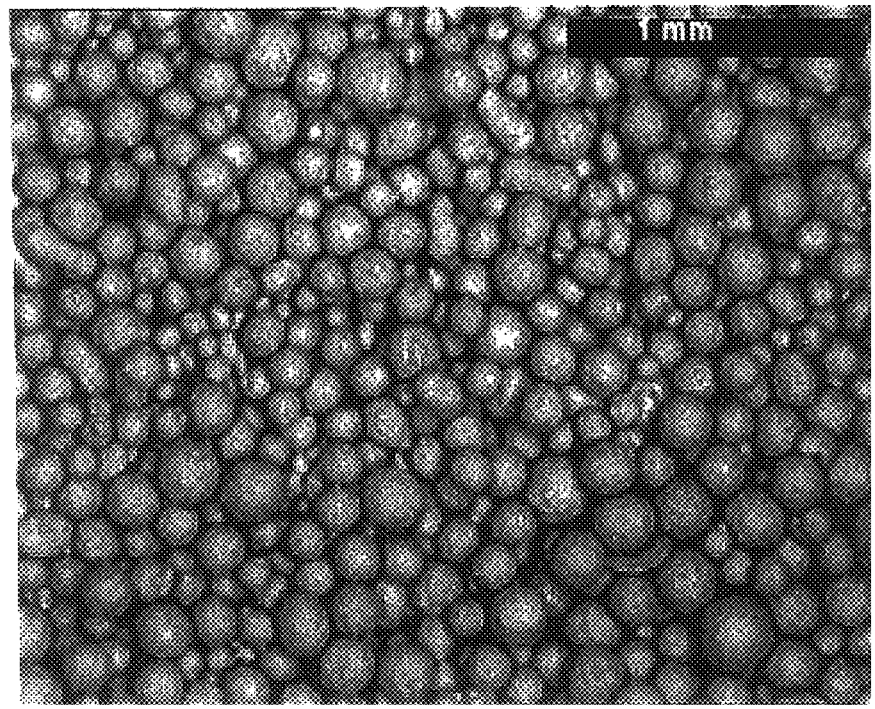
FIG. 4 shows agglomerates dried according to known technique in a 30×magnification.
Figure 5:
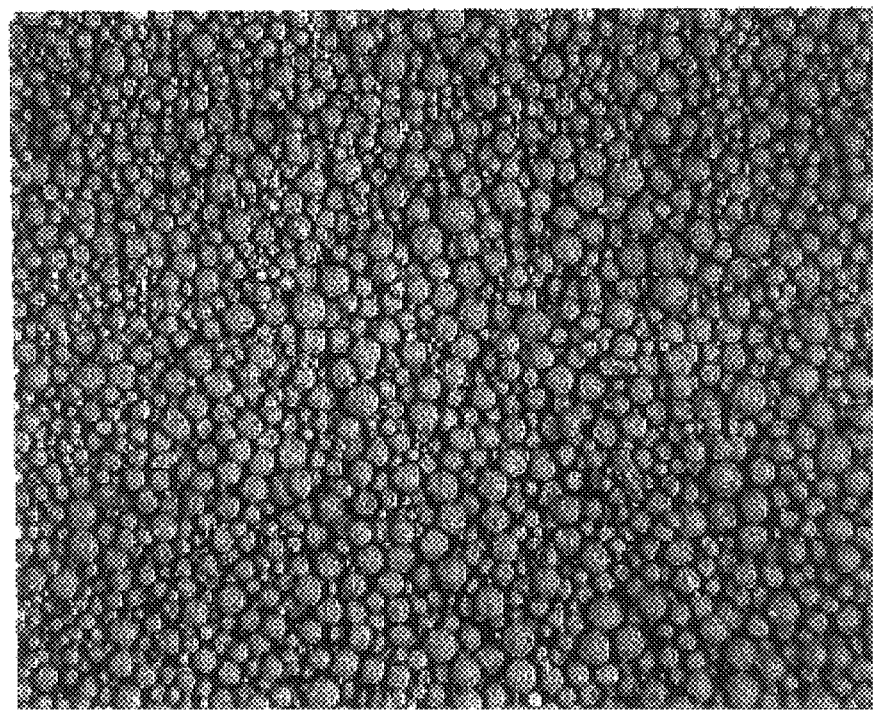
FIG. 5 shows agglomerates dried according to the invention in a 30×magnification.

The dried powders were also studied in a microscope and it was found that powder dried according to invention exhibited not only more even agglomerate size distribution, but also a better quality of the agglomerates, see FIG. 4 and 5.

Flow measurement according to Hall Flow ISO 4490 for powder dried according to invention gave a value of 31–32 s and for the known technique a value of 34–35 s.

The principles, in preferred embodiments of the present invention have been described in the foregoing specification. However, the invention which is intended to be protected is not to be construed as limited to the particular embodiments disclosed above. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A method of making drops from a slurry, the method comprising the steps of:
   (i) introducing the slurry into a distribution region of a drop forming apparatus, the distribution region comprising at least one discharge opening;
   (ii) ejecting the slurry from the at least one a discharge opening to form a jet such that the jet hits an inwardly and downwardly oriented first oblique rotating surface of a first rotating disk;

(iii) rotating the first surface at a speed such that the jet is forced upwards over the first surface and over another connected horizontal surface of the first rotating disk by centrifugal forces;

(iv) dividing and directing the jet towards an outwardly and downwardly oriented second oblique rotating surface of an axially mounted disk-shaped section on top of the first disk;

(v) rotating the second surface such that the slurry in the jet is accelerated to the speed of rotation of the second surface;

(vi) directing the jet onto an outwardly oriented third oblique rotating surface, from which drops of the slurry detach themselves when centrifugal forces on the third surface exceeds adhesive forces between the drops and the third surface.

2. The method according to claim 1, wherein the first surface has an inclination angle of 45–55° relative to a horizontal plane.

3. The method according to claim 1, wherein the second surface has an inclination angle of 65–75° relative to a horizontal plane.

4. The method according to claim 1 wherein the third surface has an inclination angle of <10° relative to a horizontal plane.

5. A powder of agglomerates of cemented carbide, cermets, ceramics or similar materials with abrasive wear resistance formed from drops made according to claim 1.

6. The powder of claim 5, wherein the agglomerates have a distribution of grain sizes with a ratio d97/d03<4 wherein
 d97=the grain size below which 97% of the agglomerates is found and d03=the grain size below which 3% of the agglomerates is found.

7. Powder agglomerates of cemented carbide, cermets, ceramics or similar materials with abrasive wear resistance wherein the agglomerates have a distribution of grain size, prior to sieving, such that a ratio of d97/d03<4 wherein
 d97=the grain size below which 97% of the agglomerates is found and d03=the grain size below which 3% of the agglomerates is found.

* * * * *